(12) United States Patent
Hasegawa et al.

(10) Patent No.: US 8,363,691 B2
(45) Date of Patent: Jan. 29, 2013

(54) PILOT MULTIPLEXING METHOD AND OFDM TRANSCEIVER APPARATUS IN OFDM SYSTEM

(75) Inventors: Tsuyoshi Hasegawa, Kawasaki (JP); Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 822 days.

(21) Appl. No.: 11/329,954

(22) Filed: Jan. 10, 2006

(65) Prior Publication Data

US 2006/0114815 A1 Jun. 1, 2006

Related U.S. Application Data

(63) Continuation of application No. PCT/JP03/09562, filed on Jul. 29, 2003.

(51) Int. Cl.
*H04B 1/00* (2006.01)

(52) U.S. Cl. .......................... 375/130; 370/335; 370/342

(58) Field of Classification Search .................. 375/130, 375/140, 141, 142, 146–147, 150; 370/206, 370/335, 342, 344, 491
See application file for complete search history.

(56) References Cited

U.S. PATENT DOCUMENTS

| | | | |
|---|---|---|---|
| 5,307,376 A | | 4/1994 | Castelain et al. |
| 5,774,450 A | | 6/1998 | Harada et al. |
| 6,034,986 A | * | 3/2000 | Yellin .......................... 375/148 |
| 6,459,402 B1 | | 10/2002 | Tsunehara et al. |
| 6,606,296 B1 | * | 8/2003 | Kokkonen ..................... 370/203 |
| 6,628,701 B2 | * | 9/2003 | Yellin .......................... 375/148 |
| 6,999,467 B2 | * | 2/2006 | Krauss et al. ................. 370/441 |
| 7,020,122 B1 | * | 3/2006 | Hirai et al. ..................... 370/342 |
| 7,092,431 B2 | * | 8/2006 | Maeda et al. ................. 375/144 |
| 7,177,344 B2 | * | 2/2007 | Oates ............................. 375/143 |
| 7,221,699 B1 | * | 5/2007 | Lindskog ....................... 375/147 |
| 7,236,452 B2 | * | 6/2007 | Maeda et al. ................. 370/210 |
| 7,280,467 B2 | * | 10/2007 | Smee et al. .................... 370/208 |
| 7,298,692 B2 | * | 11/2007 | Hiramatsu et al. ............ 370/208 |
| 7,474,691 B2 | * | 1/2009 | Dunyak et al. ................ 375/148 |
| 7,505,510 B2 | * | 3/2009 | Dunyak et al. ................ 375/148 |
| 2001/0022807 A1 | | 9/2001 | Yotsumoto |
| 2002/0054620 A1 | | 5/2002 | Maruyama |
| 2003/0147358 A1 | * | 8/2003 | Hiramatsu et al. ............ 370/281 |
| 2004/0062317 A1 | * | 4/2004 | Uesugi et al. ................. 375/260 |
| 2004/0156421 A1 | * | 8/2004 | Yamaguchi .................... 375/130 |
| 2004/0170238 A1 | | 9/2004 | Matsuyama et al. |

(Continued)

FOREIGN PATENT DOCUMENTS

| | | |
|---|---|---|
| EP | 1 033 823 | 4/2003 |
| FR | 2 851 384 | 8/2004 |

(Continued)

OTHER PUBLICATIONS

Supplementary European Search Report dated Sep. 25, 2008, from the corresponding European Application.

(Continued)

*Primary Examiner* — Jean B Corrielus
(74) *Attorney, Agent, or Firm* — Katten Muchin Rosenman LLP

(57) ABSTRACT

Disclosed is a pilot multiplexing method in an Orthogonal Frequency Division Multiplexing (OFDM) system. Transmit data is transmitted by an OFDM signal through an OFDM scheme, pilot data is directly spread, and a spread-spectrum signal, which has been obtained by spreading, is transmitted in the same frequency band as that of the OFDM signal at the same time in superposition therewith or time-division multiplexed therewith. The spread-spectrum signal is a CDMA signal that has been obtained by spreading the pilot data by a prescribed spreading code.

2 Claims, 17 Drawing Sheets

U.S. PATENT DOCUMENTS

| | | | |
|---|---|---|---|
| 2004/0228267 A1* | 11/2004 | Agrawal et al. | 370/203 |
| 2004/0252629 A1 | 12/2004 | Hasegawa et al. | |
| 2005/0013383 A1* | 1/2005 | Sudo et al. | 375/260 |
| 2005/0063327 A1* | 3/2005 | Krauss et al. | 370/320 |
| 2006/0209672 A1* | 9/2006 | Tarokh et al. | 370/208 |
| 2006/0268786 A1* | 11/2006 | Das et al. | 370/335 |
| 2007/0104280 A1 | 5/2007 | Ibrahim et al. | |
| 2007/0211790 A1* | 9/2007 | Agrawal et al. | 375/147 |

FOREIGN PATENT DOCUMENTS

| | | |
|---|---|---|
| GB | 2 344 259 | 5/2000 |
| JP | 5-75568 | 3/1993 |
| JP | 7-245574 | 9/1995 |
| JP | 8-251135 | 9/1996 |
| JP | 9-233047 | 9/1997 |
| JP | 10-210002 | 8/1998 |
| JP | 2000-115060 | 4/2000 |
| JP | 2000-201134 | 7/2000 |
| JP | 2000-509580 | 7/2000 |
| JP | 2000-252962 | 9/2000 |
| JP | 2000-286821 | 10/2000 |
| JP | 2001-1144724 | 5/2001 |
| JP | 2001-196973 | 7/2001 |
| JP | 2001-285247 | 10/2001 |
| JP | 2002-14152 | 1/2002 |
| JP | 2002-64408 | 2/2002 |
| JP | 2003-32217 | 1/2003 |
| WO | WO 97/41647 | 11/1997 |
| WO | PCT/JP01/08488 | 9/2001 |
| WO | PCT/JP02/00059 | 1/2002 |
| WO | WO 03/017547 | 2/2003 |
| WO | 03/034645 | 4/2003 |
| WO | 03/061170 | 7/2003 |

OTHER PUBLICATIONS

Fredrik Tufvesson, et al. "OFDM Time and Frequency Synchronization by Spread Spectrum Pilot Technique" Communication Theory Mini-Conference, Vancouver, BC, Canada, Jun. 6, 1999, pp. 115-119.

Soichi Watanabe, et al. "Burst Synchronization Scheme for Millimeter Band OFDM" Proceedings of the IEEE 54th Vehicular Technology Conference, vol. 3, Oct. 7, 2001, pp. 1706-1710.

Notification of Reasons for Refusal dated Jan. 15, 2008, from the corresponding Japanese Application.

Chinese Office Action dated May 15, 2009, from the corresponding Chinese Application.

Fredrik Tufvesson, et al. "OFDM Time and Frequency Synchronization by Spread Spectrum Pilot Technique" Communication Theory Mini-Conference, Vancouver, Canada, IEEE, Jun. 6, 1999.

European Office Action dated Sep. 13, 2010, from the corresponding European Application.

Urs Fawer. "A Coherent Spread-Spectrum Diversity-Receiver with AFC for Multipath Fading Channels" IEEE Transactions on Communications, vol. 42, No. 2/3/4, Feb./Mar./Apr. 1994.

Ramjee Prasad. "CDMA for Wireless Personal Communications" Mobile Communications Series, Artech House Publishers, Jan. 1, 1996, pp. 320-327.

International Search Report dated Oct. 14, 2003.

* cited by examiner

FIG. 22 PRIOR ART
(a)
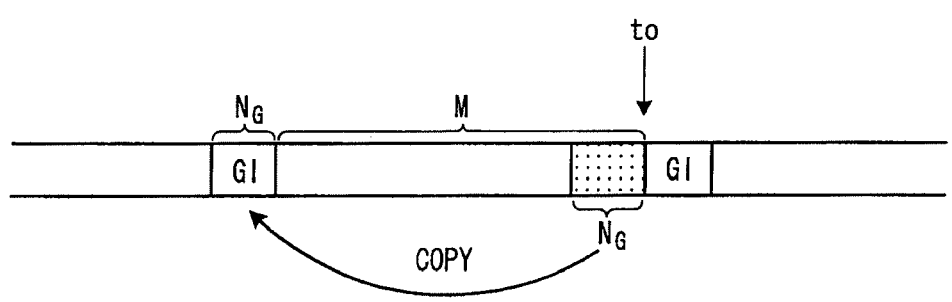
(b)
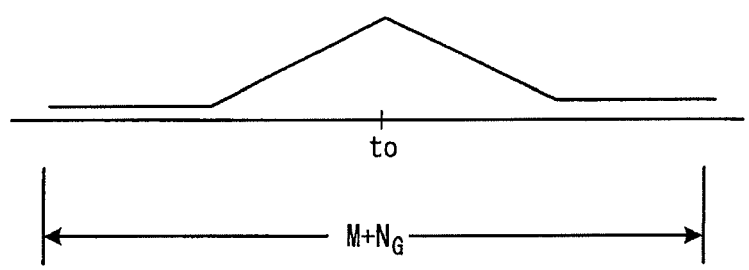

PILOT MULTIPLEXING METHOD AND OFDM TRANSCEIVER APPARATUS IN OFDM SYSTEM

CROSS-REFERENCE TO RELATED APPLICATION

This application is a continuation of International Application PCT/JP03/09562, filed on Jul. 29, 2003, pending at the time of filing of this continuation application, the contents of which are herein wholly incorporated by reference.

BACKGROUND OF THE INVENTION

This invention relates to a pilot multiplexing method and transceiver apparatus in an Orthogonal Frequency Division Multiplexing (OFDM) system and, more particularly, to a pilot multiplexing method and OFDM transceive apparatus in an OFDM system for transmitting transmit data by an OFDM signal through an OFDM scheme, and transmitting pilot data by a spectrum signal, e.g., a CDMA signal, in a frequency band identical with that of the OFDM signal.

FIG. 17 is a diagram of the structure of an OFDM transmitting apparatus in an OFDM (Orthogonal Frequency Division Multiplexing) transmission system. User data (channel data) is input to an OFDM modulator 1 serially at a prescribed bit rate. A serial/parallel converter 1a converts input data to M-bit parallel data $S_1$ to $S_M$, i.e., frequency-domain data of subcarriers $f_1$ to $f_M$, by a serial-to-parallel conversion. An IFFT unit 1b, which is for transmitting the frequency-domain data $S_1$ to $S_M$ by the subcarriers $f_1$ to $f_M$, applies an IFFT operation to this frequency data and converts the data to time-domain waveform data. In order to remove inter-symbol interference, a GI (Guard Interval) insertion unit 1c attaches a part of the tail-end data of the time-domain data to the leading end of the data as a guard interval and outputs the resultant signal as an OFDM symbol. A DA converter 1d converts this to an analog signal. An up-converter 2 up-converts the OFDM modulated signal (OFDM signal), which enters from the OFDM modulator 1, to a high-frequency signal, and a transmit amplifier 3 amplifies the high-frequency signal, which is then emitted into space from an antenna.

FIG. 18 is a diagram useful in describing a serial-to-parallel conversion. Here a pilot P has been time-multiplexed to the front end of one frame of transmit data. It should be noted that the pilot P can also be dispersed within a frame, as illustrated in FIG. 19. If the pilot per frame is, e.g., 4×M symbols and the transmit data is 28×M symbols, then M symbols of the pilot will be output from the serial/parallel converter 1a as parallel data the first four times, and thereafter M symbols of the transmit data will be output from the serial/parallel converter 1a as parallel data 28 times. As a result, in the period of one frame the pilot can be time-multiplexed into all subcarriers and transmitted four times. By using this pilot on the receiving side, channel estimation is performed on a per-subcarrier basis and channel compensation (fading compensation) becomes possible.

FIG. 20 is a diagram useful in describing insertion of a guard interval. If an IFFT output signal conforming to M×N subcarrier samples (=1 OFDM symbol) is taken as one unit, then guard-interval insertion signifies copying the tail-end portion of this symbol to the leading-end portion thereof. Inserting a guard interval GI makes it possible to eliminate the effects of inter-symbol interference (ISI) ascribable to multipath.

FIG. 21 is a diagram of the structure of an OFDM receiving apparatus in an OFDM transmission system. A down-converter 5 applies frequency conversion processing to a high-frequency signal that has been sent from a transceiving apparatus, the receive signal obtained by the frequency conversion is subjected to AGC amplification in an AFC amplifier 6, the resultant signal is converted to a digital signal by an AD converter 7 and the digital signal is input to an OFDM demodulator 8.

In the OFDM demodulator, a symbol timing detector 8a detects the timing of the OFDM symbol based upon correlation of the guard interval (GI) (PCT/JP01/08488). As shown in (a) of FIG. 22, the guard interval GI is created by copying, to the leading end of M-number of samples of the OFDM valid symbol, a tail-portion of $N_G$-number of samples. Therefore, by calculating the correlation between the receive signal that prevailed one OFDM valid symbol earlier (M samples earlier) and the present receive signal, the correlation value will be maximized at the portion of the guard interval GI, as indicated at (b) in FIG. 22. The timing $t_0$ at which the correlation value is maximized is the start timing of the OFDM symbol. A GI removal unit 8b removes the guard interval that has been inserted based upon the OFDM-symbol start timing and inputs the resultant signal to an FFT operation unit 8c.

The FFT operation unit 8c executes FFT processing at an FFT window timing and converts the time-domain signal to M-number of subcarrier signals (subcarrier samples) $S_1'$ to $S_M'$. A channel estimation unit 8d performs channel estimation for every subcarrier $f_1$ to $f_M$ using the pilot that has been time-multiplexed on the transmitting side, and a channel compensator 8e multiplies the FFT output by channel estimation values $CC_1$ to $CC_M$ of each of the subcarriers, thereby compensating for fading.

The channel estimation unit 8d sums, on a per-subcarrier basis, a plurality of symbol's worth of subcarrier components $S_1'$-$S_M'$ of each pilot symbol that is output from the FFT operation unit 8c and calculates the channel estimation values $CC_1$ to $CC_M$ of each of the subcarriers based upon the average values. That is, the channel estimation unit 8d estimates the influence exp(jφ) of fading on phase of each subcarrier using the known pilot signal, and a channel compensator 8e multiplies the subcarrier signal component of the transmit symbol by exp(−jφ) to compensate for fading.

A parallel/serial converter 8f converts parallel data (subcarrier components $S_1'$ to $S_M'$), which has been channel-compensated by the channel compensator 8e, to parallel data, inputs this data to a data demodulator (not shown) and decodes the transmit data.

The channel estimation values are obtained from the pilot symbol of a known signal. However, there are instances where an average of several symbols is obtained in order to improve the S/N ratio. With regard to the channel value, since it is known that there is some degree of correlation in both the time direction and subcarrier direction, the average can be calculated in a region that extends in both the time and subcarrier directions. FIG. 23 illustrates an example of frame structure. In this case, the frame extends over eight symbols and averaging is performed two subcarriers at a time (total 2×8=16). The reason for obtaining the channel estimation value by averaging as set forth above is that since each symbol contains noise, the influence of such noise is eliminated by averaging to thereby improve the S/N ratio. If subcarriers are very close in terms of frequency, the channel values are almost the same and therefore no problems are caused by averaging.

With the above-described OFDM communication, only one pilot can be used and it is not possible to cope with a case where use of pilots of a plurality of types is desired. For example, in an arrangement in which the zone of a base station BS is divided into sectors and directional beams are emitted from antennas AT1 to AT3 in respective ones of sectors SC1 to SC3, as shown in FIG. 24, it is necessary to identify mobile stations MS1 to M53 sector by sector. Consequently, it is necessary to use pilots that differ for every sector. With the conventional schemes, however, using pilots of a plurality of types is impossible.

A method that uses orthogonal codes is available as one method of multiplexing pilots of a plurality of types (PCT/JP02/00059). As shown in FIG. 25, this method adopts m (=2) adjacent subcarriers at a time as a set and multiplies a total of 16 subcarrier components of each of the sets in n (=8) pilot symbols by orthogonal codes $K_0$ to $K_{15}$ shown in FIG. 26. In accordance with this method, pilot signals the number of which is equivalent to the number of orthogonal codes can be multiplexed at the same frequency and same timing.

Problems of the Prior Art

In a conventional OFDM according to the prior art, use is made of guard-interval correlation in order to detect the leading-end timing of an OFDM symbol at initial synchronization. With the prior art, however, a problem is that the correlation characteristic is sluggish and, hence, it is difficult to improve detection precision. A further problem is that this detection precision has an influence on data demodulation performance.

In another example of prior art, a master station transmits a symbol synchronization signal toward a slave station by a CDMA scheme. At the slave station, a CDMA decoder decodes a CDMA receive signal and an OFDM synchronizing circuit transmits an OFDM signal through an OFDM modulator and high-frequency converter in sync with the symbol synchronization signal (JP10-210002A). In accordance with this prior art, timing detection precision can be improved. However, since CDMA transmission is performed only for the sake of synchronization, there are problems in terms of performance and cost.

Further, according to the prior art, the pilots are multiplexed by multiplication using orthogonal code. However, with such prior art, each pilot cannot be demultiplexed until the code is received in its entirety. Consequently, it is not possible to cope with an instance where a momentary channel estimation value is desired at the stage where one or two pilot symbols, for example, have been received. Further, with the method of multiplexing pilots by multiplication using the orthogonal code $K_0$ to $K_{15}$ of 16 bits, a maximum of only 16 pilots can be multiplexed and there is little degree of freedom.

SUMMARY OF THE INVENTION

Accordingly, an object of the present invention is to so arrange it that the precision with which the timing of a frame or OFDM symbol, etc., is detected can be improved and to make it possible to perform channel estimation.

Another object of the present invention is to so arrange it that momentary channel estimation can be performed by receiving one or two pilot symbols, and so that many pilots can be multiplexed.

A transmitting apparatus of the present invention in an OFDM communication system transmits transmit data by an OFDM signal through an OFDM scheme, directly spreads pilot data and transmits a spectrum signal, which has been obtained by spreading, in the same frequency band as that of the OFDM signal at the same time in superposition therewith or time-division multiplexed therewith. The transmitting apparatus uses a CDMA signal, which has been obtained by spreading the pilot data by a prescribed spreading code, as the spread-spectrum signal.

A receiving apparatus of the present invention in an OFDM communication system obtains a delay profile by calculating correlation between a receive signal and a transmit-side spreading code, and acquires a timing signal of a frame or OFDM symbol from the delay profile.

Further, a receiving apparatus according to the present invention obtains a delay profile by calculating correlation between a receive signal and a transmit-side spreading code, subjects the delay profile signal to FFT processing and acquires a channel estimation value of each subcarrier in an OFDM scheme.

By virtue of the above-described embodiment, the precision with which the timing of a frame or OFDM symbol, etc., is detected can be improved, channel estimation becomes possible and performance can be enhanced. Further, momentary channel estimation can be carried out at receipt of one or two pilot symbols.

In another embodiment, a transmitting apparatus according to the present invention multiplexes a plurality of CDMA signals obtained by spreading a plurality of items of pilot data by respective ones of different spreading codes, and transmits the multiplexed CDMA signals in the same frequency band as that of an OFDM signal and at the same time in superposition therewith or time-division multiplexed therewith. Further, a receiving apparatus according to the present invention obtains delay profiles by calculating correlation between a receive signal and respective ones of transmit-side spreading codes, subjects each delay profile signal to FFT processing and acquires a channel estimation value of each subcarrier in an OFDM scheme on a per-pilot basis.

By virtue of the above-described embodiment of the present invention, momentary channel estimation can be carried out at receipt of one or two pilot symbols and sufficiently long spreading code can be used, thereby making it possible to multiplex a number of pilots.

Further, a transmitting apparatus according to the invention inserts a guard interval into an OFDM signal and a CDMA signal and removes inter-symbol interference.

Further, a receiving apparatus according to the present invention generates a replica signal of each pilot and subtracts replica signals of pilots other than a pilot of interest from a receive signal to thereby perform channel estimation of the pilot of interest. If this arrangement is adopted, reception sensitivity can be improved by utilizing an interference canceller.

Figure 7:
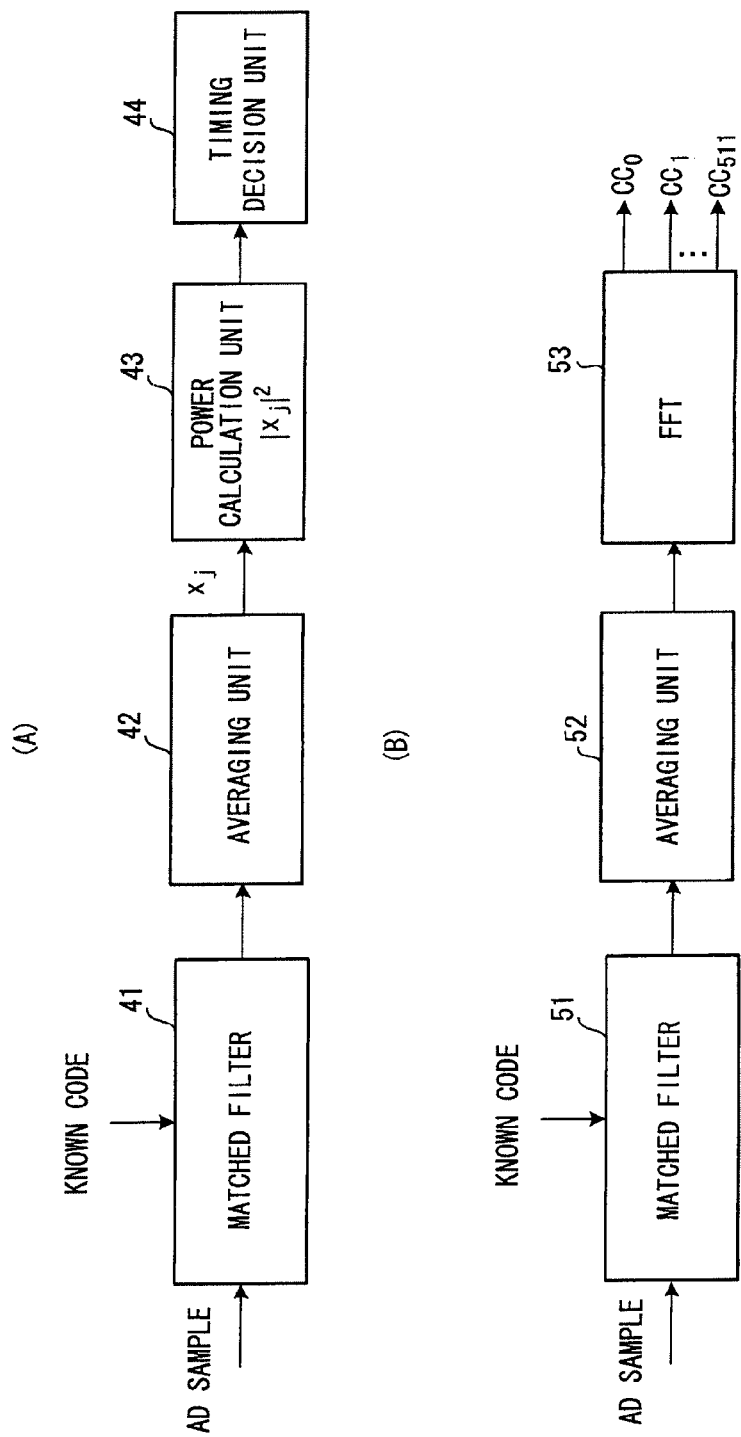
FIG. 7 is a diagram illustrating the structure of a timing detection unit for detecting OFDM frame timing [(A) of FIG.
Figure 8:
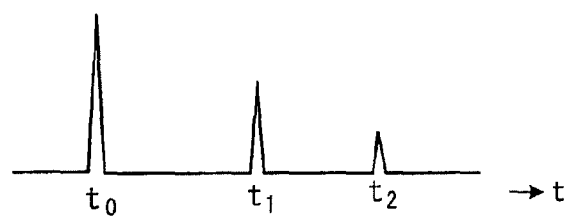
Figure 9:
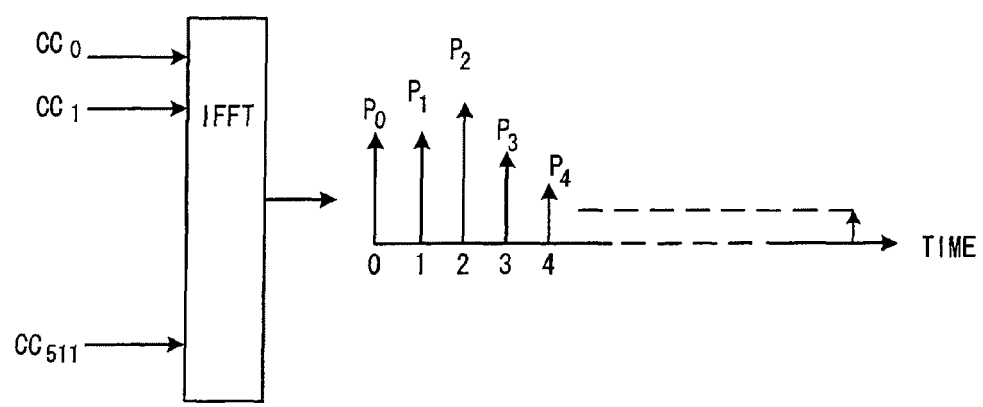
Figure 10:
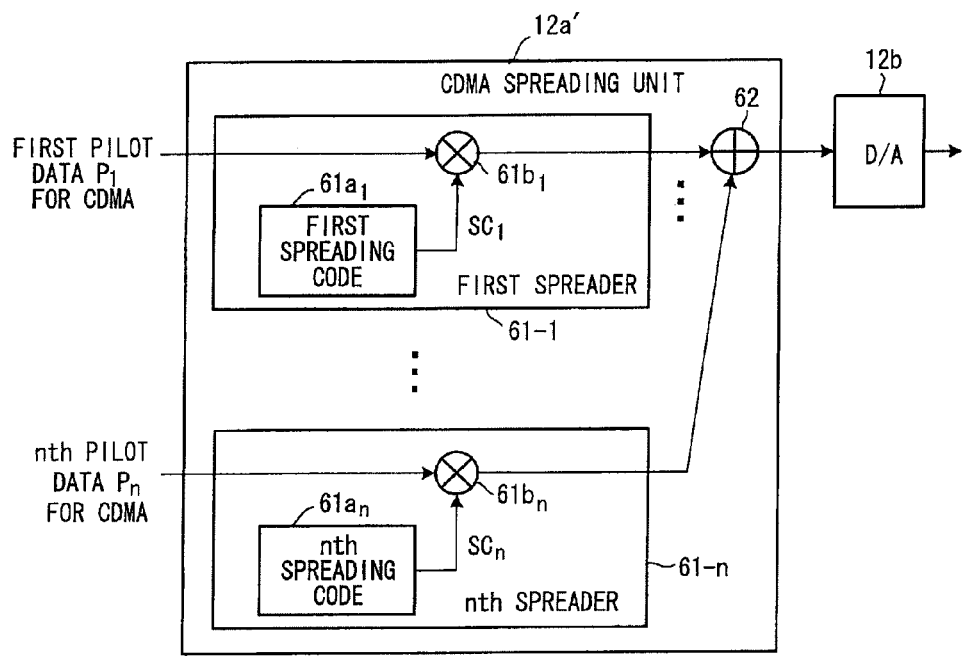
Figure 11:
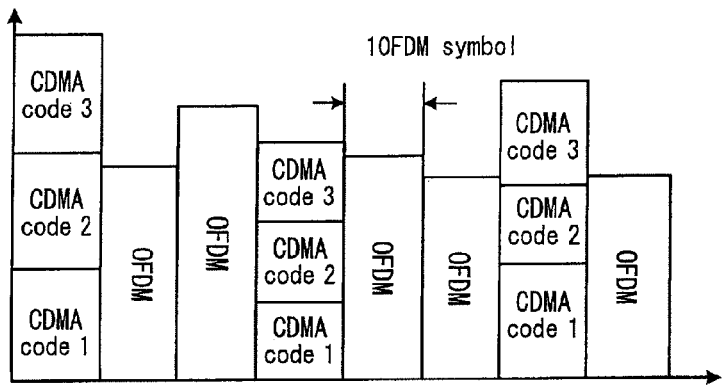
Figure 12:
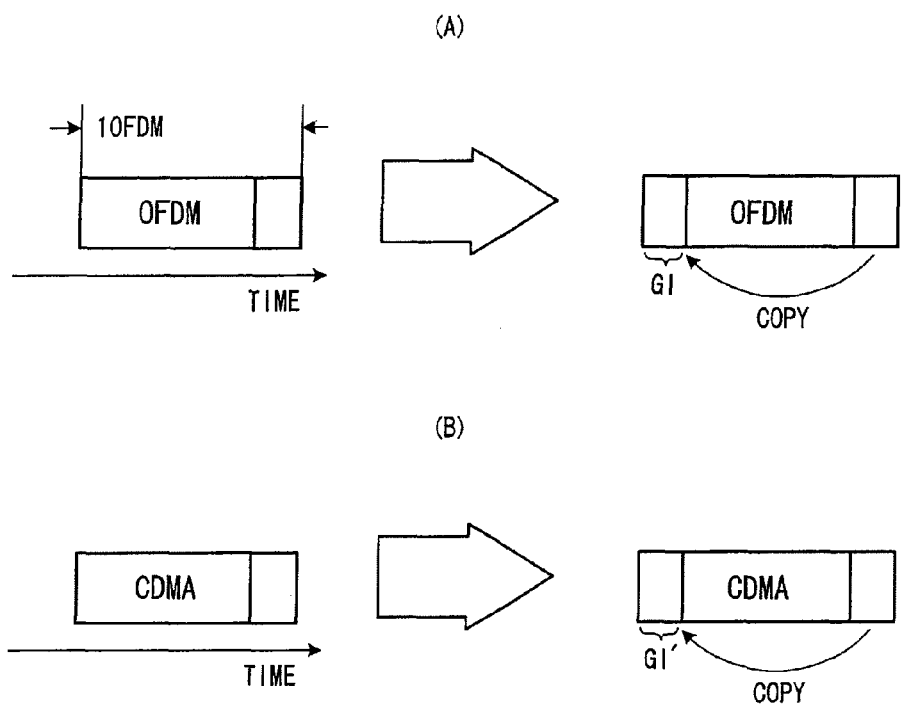
Figure 13:
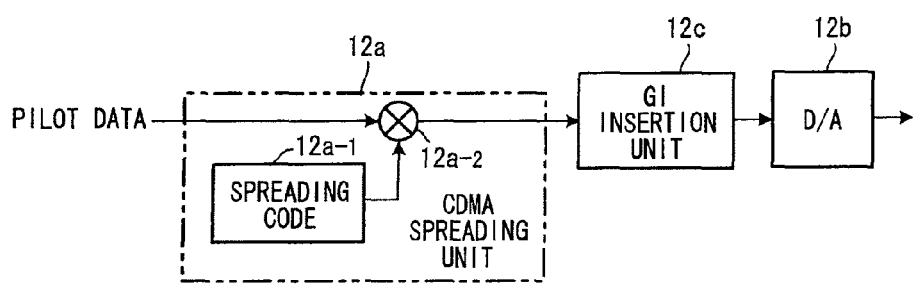
Figure 14:
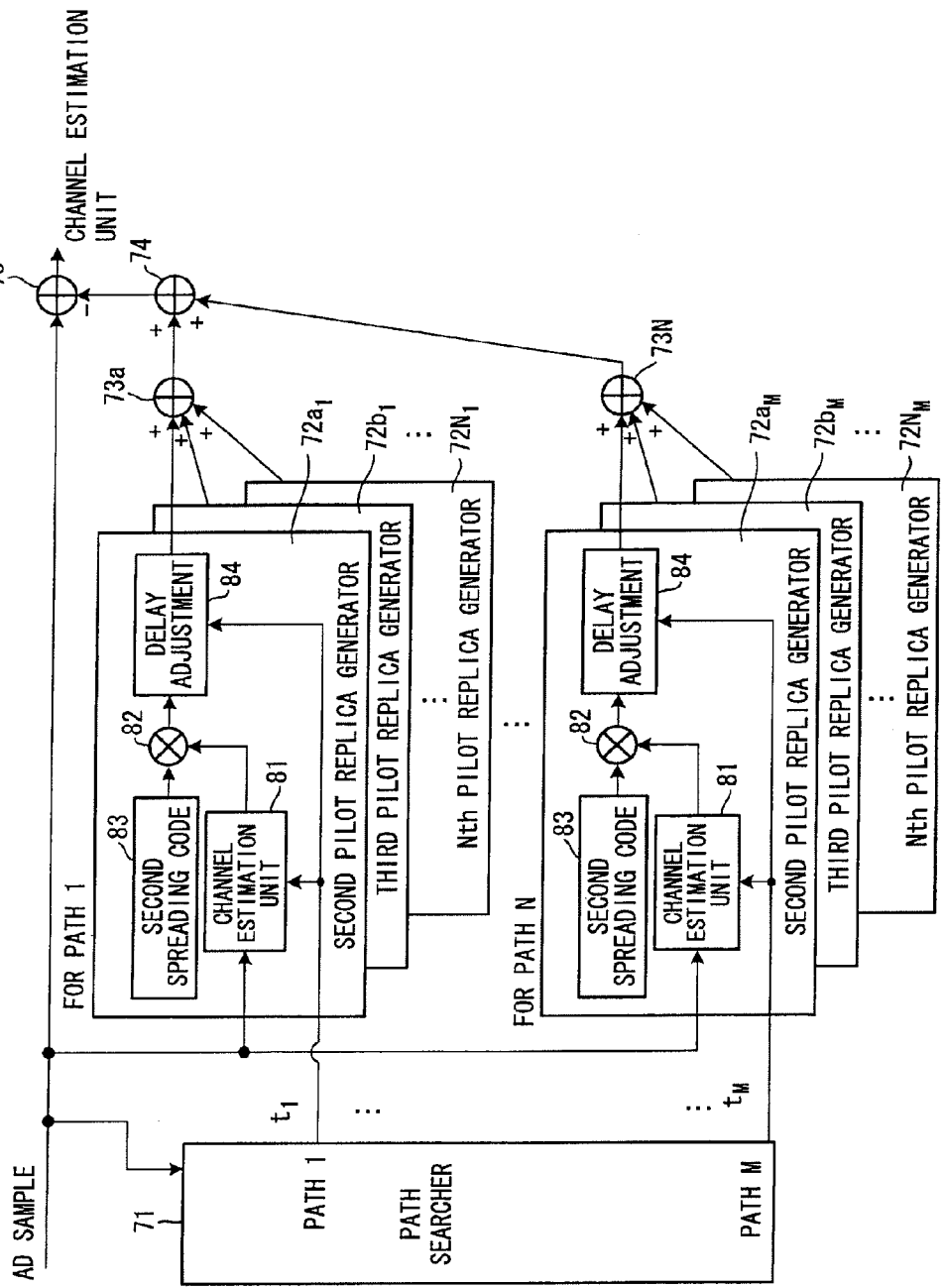
Figure 15:
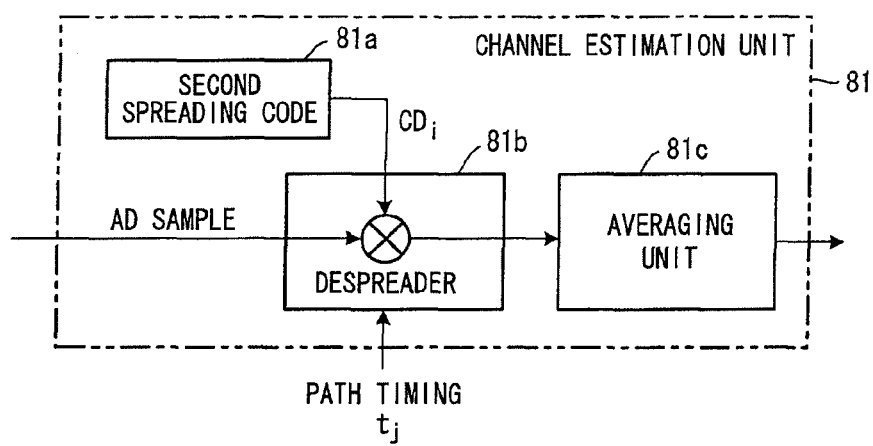
Figure 16:
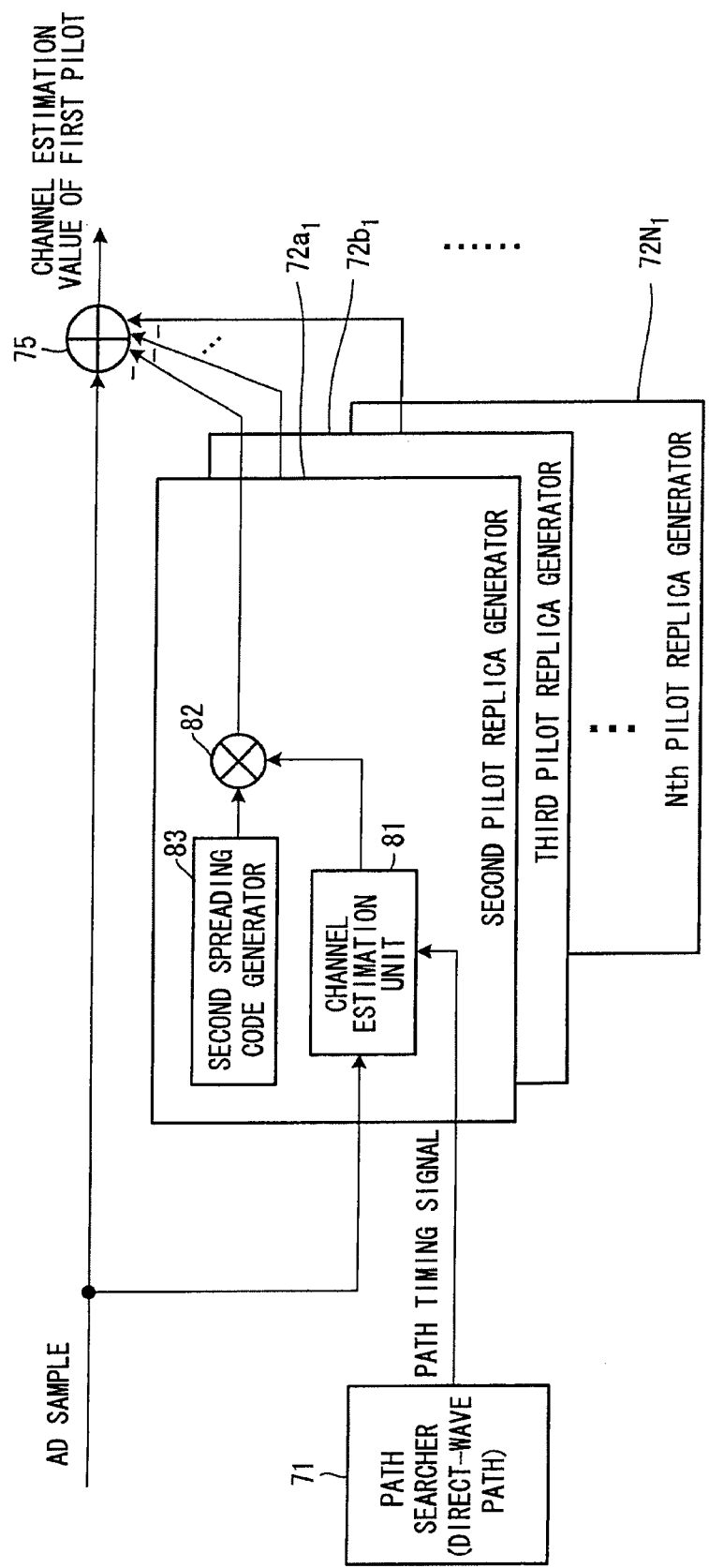
Figure 17:
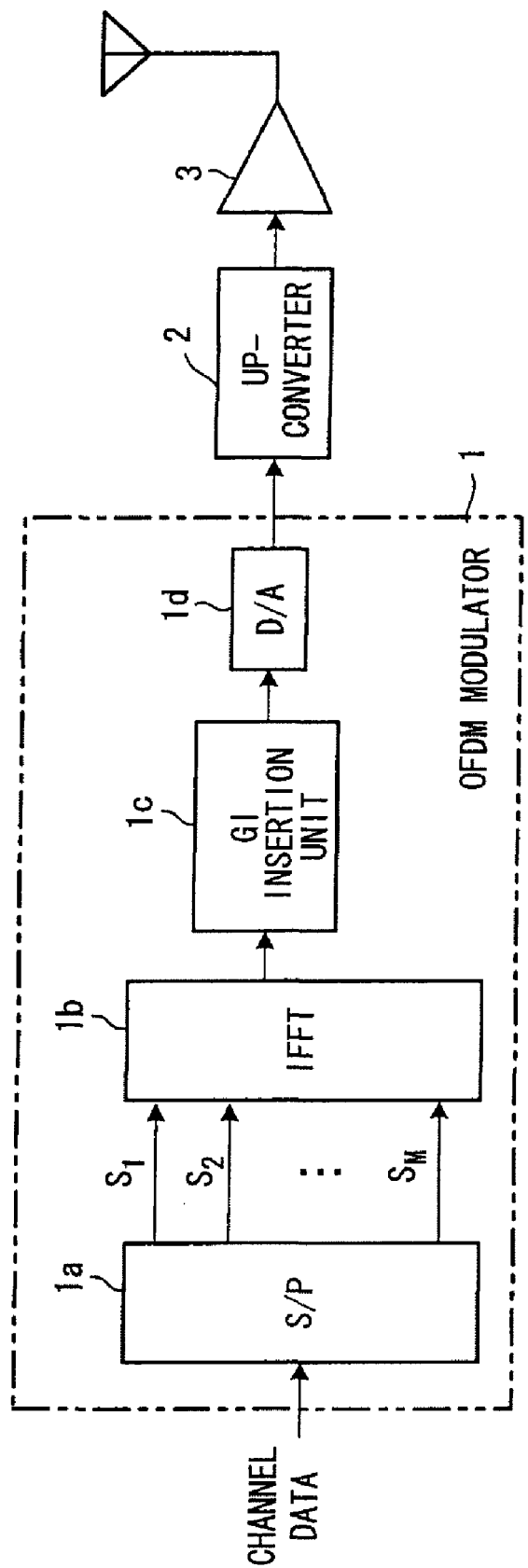
Figure 18:
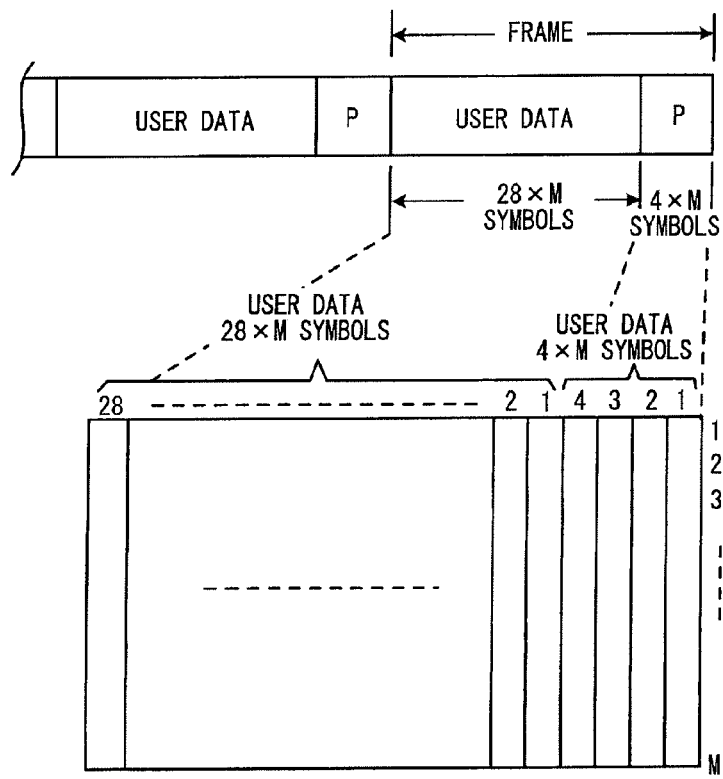
Figure 19:
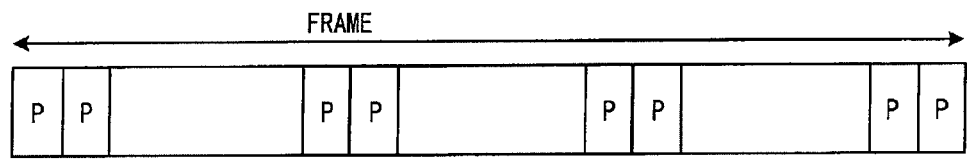
Figure 20:
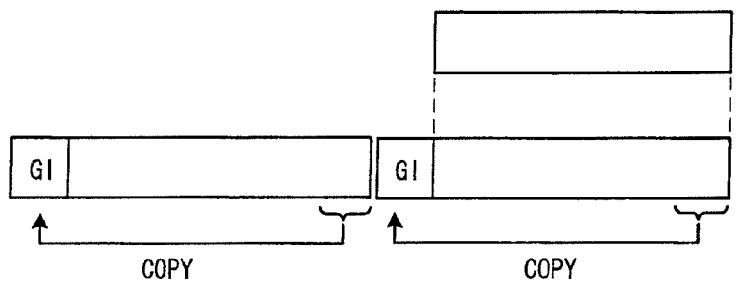
Figure 21:
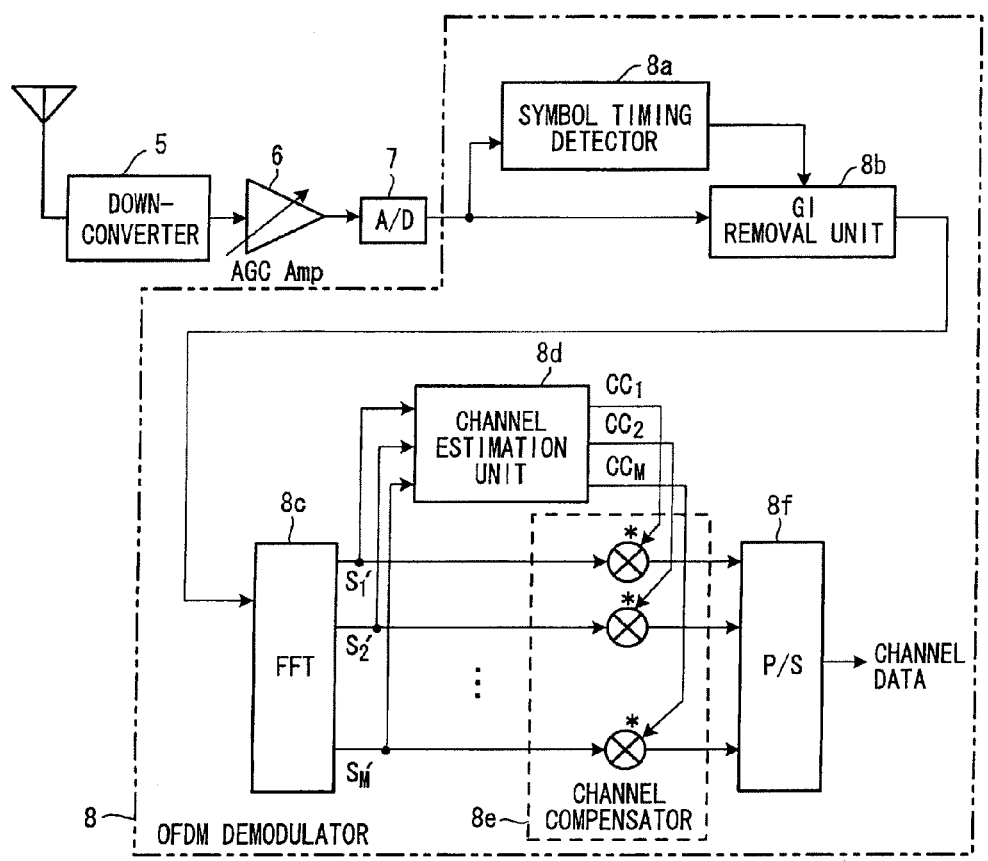
Figure 23:
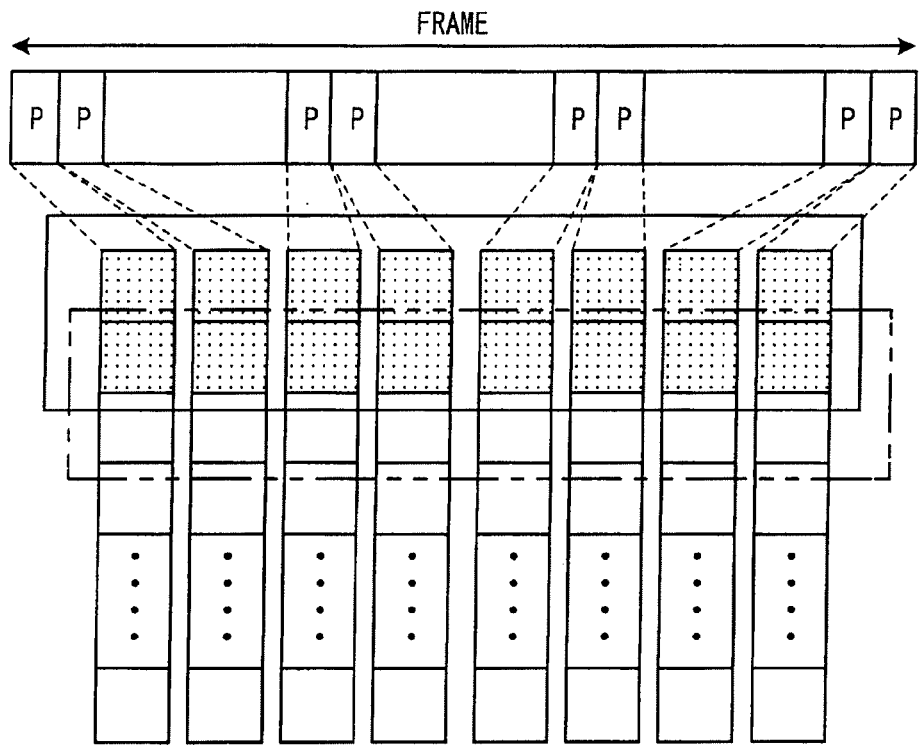
Figure 24:
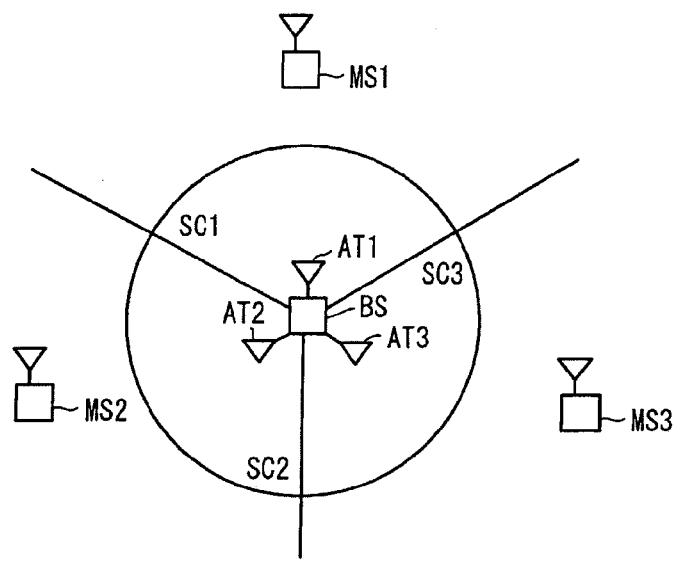
Figure 25:
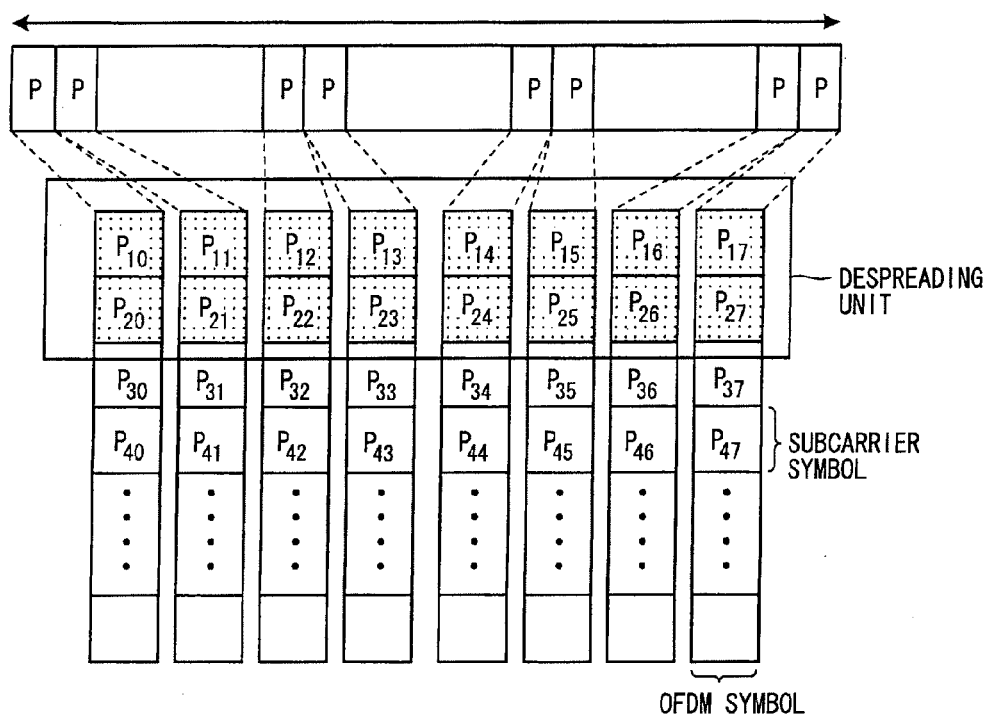
Figure 26:
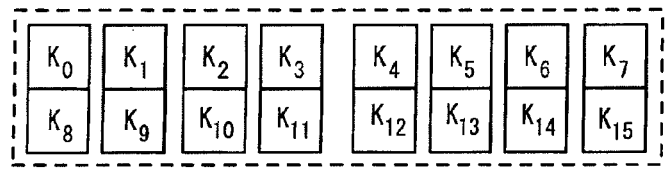

7] and the structure of a channel estimation unit for calculating a channel estimation value of each subcarrier of OFDM [(B) of FIG. 7];

FIG. 8 is a diagram for describing a delay profile;

FIG. 9 is a diagram useful in describing the principle of calculation of a channel estimation value of each subcarrier;

FIG. 10 is a diagram illustrating the structure of a CDMA modulator according to a fourth embodiment;

FIG. 11 is a diagram illustrating the manner in which three CDMA pilot signals are multiplexed and the multiplexed CDMA pilot signals are time-division multiplexed with OFDM signals and transmitted;

FIG. 12 is a diagram useful in describing the insertion of a guard interval in a CDMA signal;

FIG. 13 is a diagram illustrating the structure of a CDMA modulator according to a fifth embodiment;

FIG. 14 is a diagram illustrating the structure of an interference canceller of a sixth embodiment for removing an unwanted signal as an interference signal;

FIG. 15 is a diagram illustrating the structure of a channel estimation unit of a pilot replica generator;

FIG. 16 is a diagram illustrating the structure of an interference canceller in a case where channel estimation is performed taking only a direct wave into consideration;

FIG. 17 is a diagram illustrating the structure of a transmitting apparatus in OFDM communication;

FIG. 18 is a diagram useful in describing a serial-to-parallel conversion;

FIG. 19 is a diagram useful in describing dispersed placement of pilots;

FIG. 20 is a diagram useful in describing insertion of a guard interval;

FIG. 21 is a diagram illustrating the structure of a receiving apparatus in OFDM communication;

FIG. 22 is a diagram useful in describing timing detection according to the prior art;

FIG. 23 is a diagram useful in describing pilot detection according to the prior art;

FIG. 24 is a diagram useful in describing a case where the zone of a base station has been divided into sectors;

FIG. 25 is a diagram for describing a method of multiplexing pilot signals of a plurality of types; and FIG. 26 is a diagram useful in describing orthogonal code used in order to multiplex pilot signals of a plurality of types.

DESCRIPTION OF THE PREFERRED EMBODIMENTS (A) First Embodiment

Figure 1:
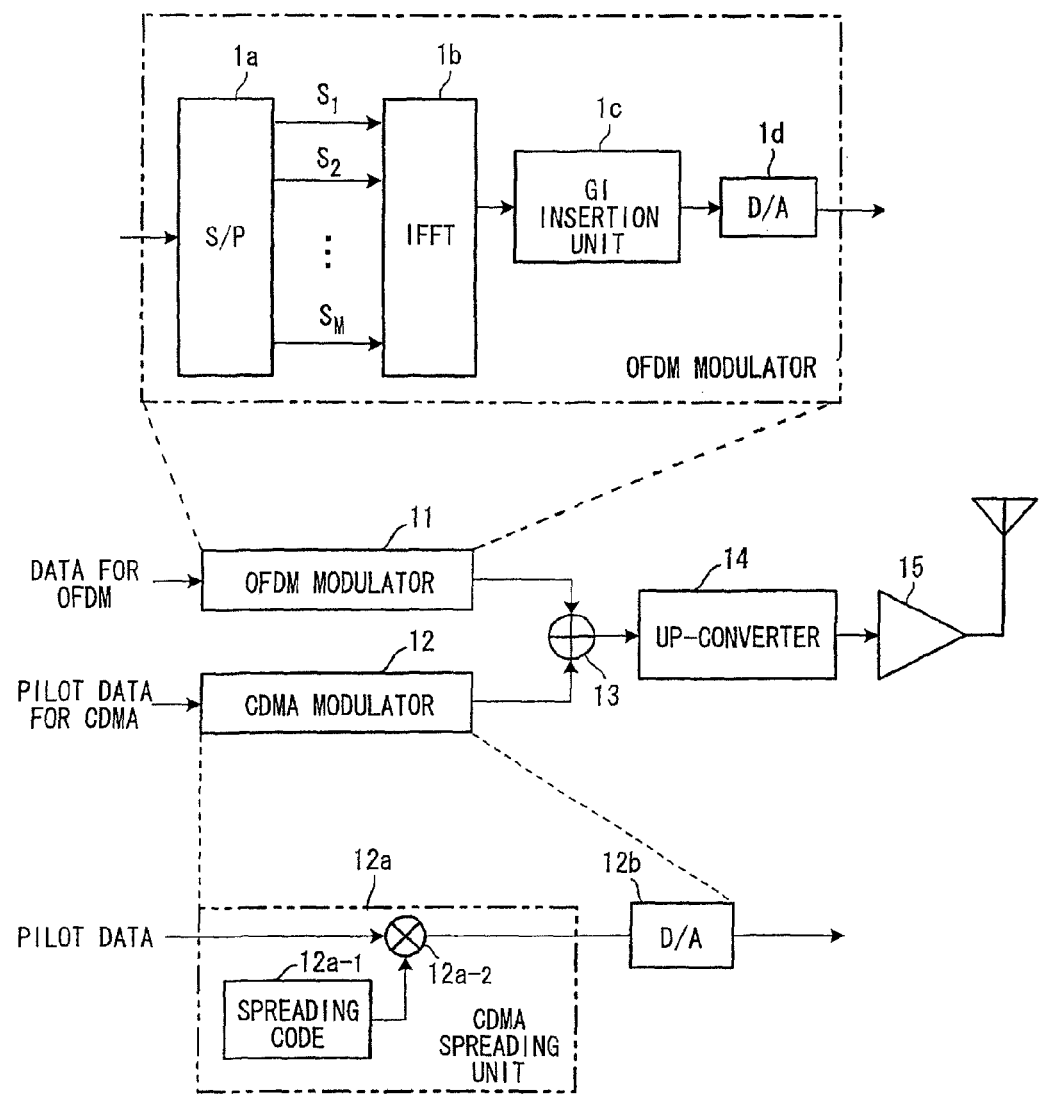
FIG. 1 is a diagram illustrating the structure of a transmitting apparatus in an OFDM system according to a first embodiment.
Figure 2:
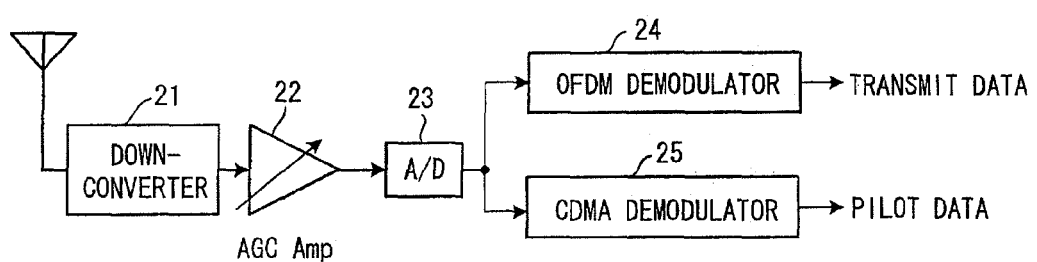
FIG. 2 is a diagram illustrating the structure of a receiving apparatus in the OFDM system.
Figure 3:
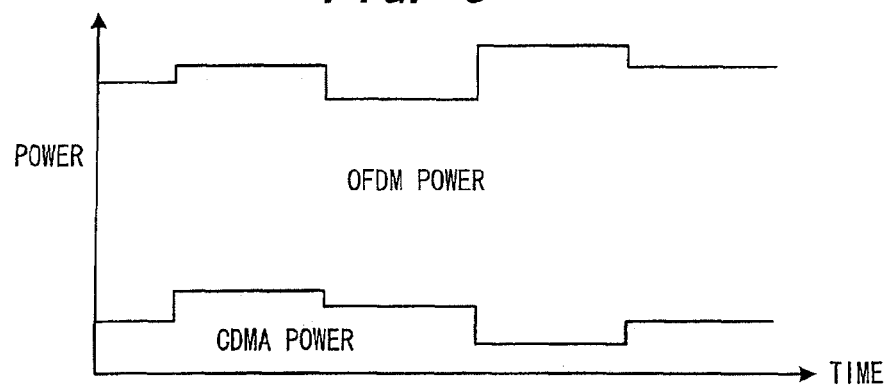
FIG. 3 illustrates an example of a frame structure (an example of fluctuation of signal power of an OFDM signal and CDMA signal with time)

FIG. 1 is a diagram illustrating the structure of a transmitting apparatus in an OFDM system according to a first embodiment, FIG. 2 is a diagram illustrating the structure of a receiving apparatus in the OFDM system, and FIG. 3 illustrates an example of frame structure.

In the transmitting apparatus of FIG. 1, an OFDM modulator 11 has a structure identical with that of the OFDM modulator 1 in FIG. 17. The modulator applies OFDM modulation to transmit data, which enters at a prescribed bit rate, and outputs the result. A CDMA modulator 12, which has a CDMA spreading unit 12a and a DA converter 12b, spreads pilot data, which enters at a bit rate identical with that of the transmit data, by a spreading code for the pilot and outputs the result. In the CDMA spreading unit 12a, a spreading code generator 12a-1 generates the spreading code for the pilot, a multiplier 12a-2 multiplies pilot data by the spreading code to thereby directly spread the data, and a DA converter 12b converts the result of multiplication to an analog signal. The spreading code in the CDMA spreading unit 12a is composed of 512 bits, and the spreading factor is 512, by way of example. A combiner 13 combines the OFDM signal, which is output from the OFDM modulator 11 and the CDMA signal, which is output from the CDMA modulator 12, in the same frequency band and at the same time, an up-converter 14 up-converts the combined signal to a high-frequency signal, and a transmit amplifier 15 amplifies the high-frequency signal and transmits the amplified signal from an antenna. The pilot data is transmitted in a form superimposed on transmit data at all times, as evident from FIG. 3.

In the receiving apparatus of FIG. 2, a down-converter 21 applies frequency conversion processing to a high-frequency signal that has been transmitted from a transmitting apparatus, an AGC amplifier 22 subjects the frequency-converted receive signal to AGC amplification, and an AD converter 23 converts the receive signal to a digital signal and inputs the digital signal to an OFDM demodulator 24 and CDMA demodulator 25. The OFDM demodulator 24, which has a structure identical with that of the OFDM demodulator 8 shown in FIG. 21, applies FFT processing to the receive signal, converts each item of subcarrier data (M-bit parallel data), which has been obtained by channel estimation/channel compensation, to serial data and demodulates the transmit data. The CDMA demodulator 25 multiplies the receive signal by a code identical with the spreading code for the pilot of the transmitting apparatus, despreads the signals and demodulates the pilot data.

FIG. 3 illustrates an example of fluctuation of signal power of the OFDM signal and CDMA signal with time. Although the OFDM signal and CDMA signal are signals that mutually interfere, the mutual interference can be made sufficiently small by making the spreading factor of the CDMA signal sufficiently large. For example, by making the spreading factor equal to 512, the CDMA signal power can be made 1/512 of the OFDM signal power, thereby making it possible to minimize interference upon the OFDM signal.

(B) Second Embodiment

Figure 4:
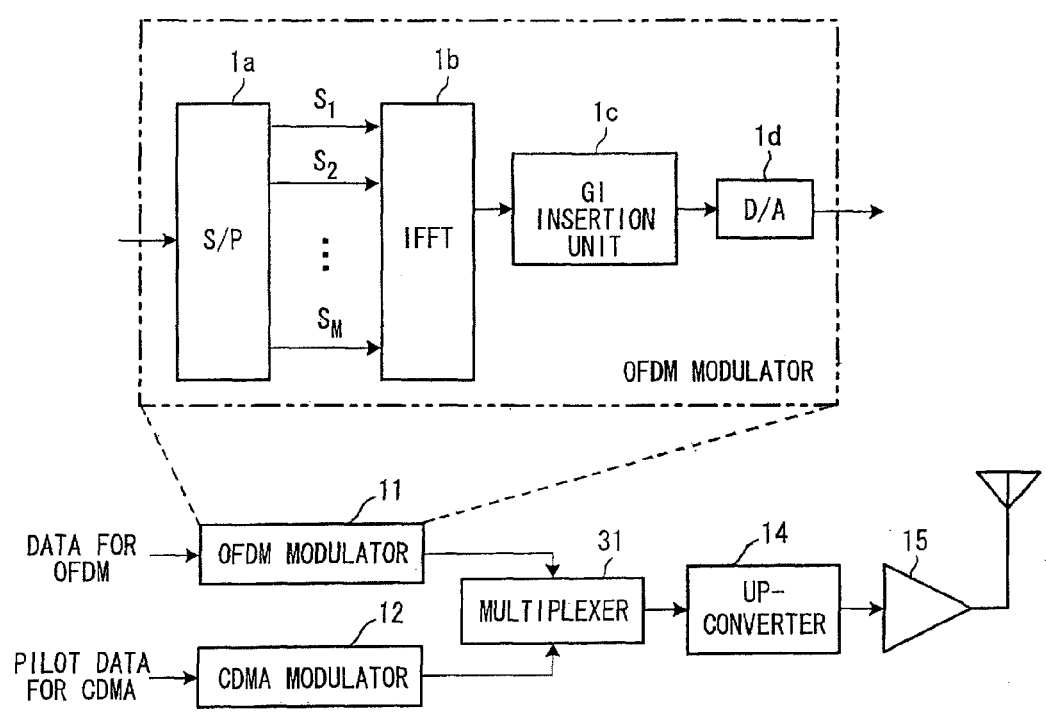
FIG. 4 is a diagram illustrating the structure of a transmitting apparatus in an OFDM system according to a second embodiment.
Figure 5:
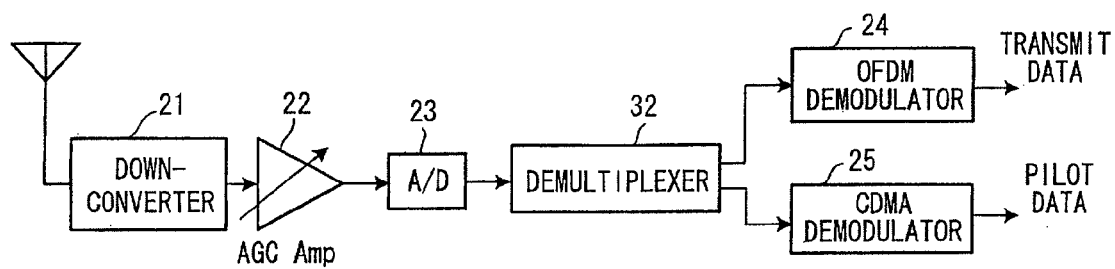
FIG. 5 is a diagram illustrating the structure of a receiving apparatus in the OFDM system.
Figure 6:
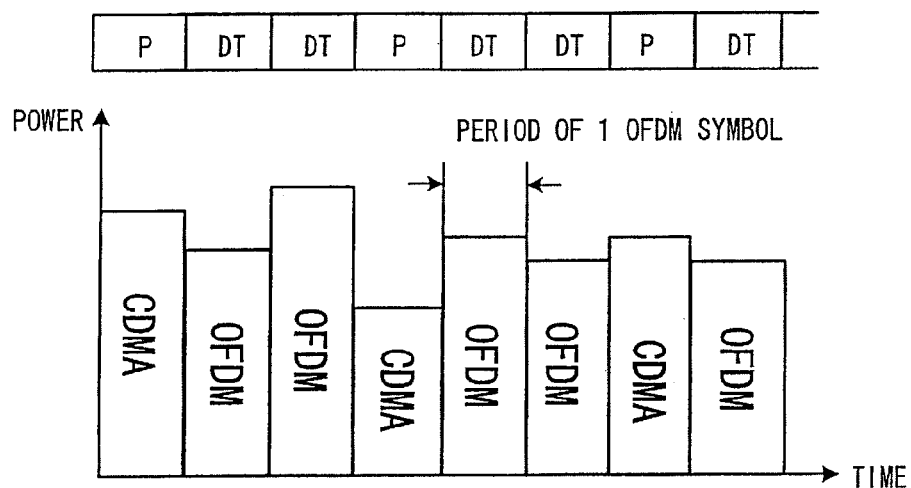
FIG. 6 illustrates an example of a frame structure (an example of fluctuation of signal power of an OFDM signal and CDMA signal with time)

FIG. 4 is a diagram illustrating the structure of a transmitting apparatus in an OFDM system according to a second embodiment, FIG. 5 is a diagram illustrating the structure of a receiving apparatus in the OFDM system, and FIG. 6 illustrates an example of frame structure.

The transmitting apparatus of FIG. 4 differs from that of FIG. 1 in the following points:

① the combiner 13 is changed to a multiplexer 31;

② items of transmit data DT and pilot data P are input to the OFDM modulator 11 and CDMA modulator 12, respectively, at the timing shown in FIG. 6; and ③ a multiplexer 31 selects and outputs CDMA signals and OFDM signals in time-division fashion at the timing shown in FIG. 6.

More specifically, in the transmitting apparatus of FIG. 4, the separately provided OFDM modulator 11 and CDMA modulator 12 input an OFDM signal and CDMA signal of the same frequency band, these signals being obtained by OFDM and CDMA modulation applied at independent timings, to the multiplexer 31, and the multiplexer 31 time-multiplexes and outputs the OFDM signal and CDMA signal input thereto. The up-converter 14 up-converts the signals, which are input thereto in time-division fashion, to a high-frequency signal, and the transmit amplifier 15 amplifies the high-frequency signals and transmits the amplified signals from the antenna.

The receiving apparatus of FIG. 5 differs from that of the first embodiment in the following points:

① a demultiplexer 32 is provided downstream of the AD converter 23;

② the demultiplexer 32 demultiplexes the time-multiplexed signal that enters from the AD converter 23 into an OFDM signal and CDMA signal, inputs the OFDM signal to the OFDM demodulator 24 and inputs the CDMA signal to the CDMA demodulator 25; and ③ the OFDM demodulator 24 applies OFDM demodulation processing to the entered OFDM signal, demodulates the transmit data and outputs the demodulated data, and the CDMA demodulator 25 applies CDMA demodulation processing to the entered CDMA signal, demodulates the pilot and outputs the pilot.

In accordance with the second embodiment, interference between the OFDM signal and CDMA signal can be eliminated, as evident from FIG. 6.

(C) Third Embodiment

In FIG. 7, (A) is a diagram showing the structure of a timing detection unit for detecting OFDM frame timing and OFDM symbol timing in a receiving apparatus.

The transmitting apparatus transmits the OFDM signal and CDMA signal by the arrangement of either the first or second embodiment, The CDMA signal is generated and transmitted by spreading known pilot data at a specific timing (e.g., the frame timing) by a known spreading code for timing.

A matched filter 41 in the timing detection unit of the receiving apparatus performs a correlation operation by multiplying the A/D-converted receive signal by the transmit-side known spreading code for timing. An averaging unit 42 calculates an average Xj of correlation at each time tj using a plurality of results of the correlation operation. A power calculation unit 43 calculates the power of the correlation value Xj at each time and generates a delay profile shown in FIG. 8. From the delay profile, a timing detector 44 decides maximum peak time to of power as frame timing and OFDM symbol timing.

In FIG. 7, (B) is a diagram showing the structure of a channel estimation unit for calculating the channel estimation value of each subcarrier. It is known that a delay profile (the frequency characteristic of impulse response) is obtained if an IFFT operation is applied to channel estimation values $CC_0$ to $CC_{511}$ of each of the subcarriers of OFDM, as shown in FIG. 9. Conversely, if an FFT operation is applied to a delay profile, the channel estimation values $CC_0$ to $CC_{511}$ of each of the subcarriers are obtained.

Accordingly, in the channel estimation unit at (B) of FIG. 7, a matched filter 51 performs a correlation operation by multiplying the A/D-converted receive signal by a known spreading code. An averaging unit 52 calculates an average Xj of correlation at each time tj using a plurality of results of the correlation operation. An FFT operation unit 53 applies FFT processing to the delay profile and outputs the channel estimation values $CC_0$ to $CC_{511}$ of subcarriers $f_0$ to $f_{511}$.

(4) Fourth Embodiment

FIG. 10 is a block diagram of a CDMA demodulator according to a fourth embodiment. This CDMA demodulator is used in place of the CDMA modulator 12 of FIGS. 1 and 4.

The CDMA modulator 12 of the fourth embodiment has a CDMA spreading unit 12a' and a DA converter 12b. The CDMA spreading unit 12a' has first to nth spreaders 61-1 to 61-n for spreading a plurality of items of pilot data P1 to Pn by spreading codes SC1 to SCn that are orthogonal to one another, and a combiner 62 for multiplexing the spread data (CDMA signals) that are output from the spreaders and inputting the multiplexed signal to the DA converter 12b. The first to nth spreaders 61-1 to 61-n have respective ones of spreading code generators $61a_1$ to $61a_n$ for generating the spreading codes SC1 to SCn, and multipliers $61b_1$ to $61b_n$ for multiplying the pilot data P1 to Pn by the spreading codes SC1 to SCn.

In the fourth embodiment, CDMA pilot signals obtained by spreading the plurality of items of pilot data P1 to Pn by the orthogonal spreading codes SC1 to SCn are multiplexed and the multiplexed CDMA pilots are superimposed temporally on or time-division multiplexed with the OFDM signals, which are generated by the OFDM modulator 11 (FIGS. 1 and 4), and transmitted.

FIG. 11 is a diagram illustrating the manner in which three CDMA pilot signals are multiplexed and the multiplexed CDMA pilot signals are time-division multiplexed with OFDM signals and transmitted. If the spreading code is 512 bits, many more pilots can be multiplexed as compared with the prior art and it is possible to demultiplex them on the receiving side.

(E) Fifth Embodiment

By inserting a guard interval of the kind shown at (A) of FIG. 12 into an OFDM symbol, interference from adjacent symbols in a multipath propagation environment is reduced, as is well known in OFDM. That is, by extracting an OFDM symbol while avoiding adjacent symbol signals that enter owing to a multipath propagation environment, interference from the adjacent symbols is reduced. Accordingly, a similar guard interval GI' is also inserted into a CDMA signal, as illustrated at (B) of FIG. 12. As a result, a CDMA symbol can be extracted while avoiding adjacent symbol signals and channel estimation precision can be improved.

FIG. 13 is a diagram showing the structure of a CDMA modulator according to a fifth embodiment. This modulator is used in place of the CDMA modulator 12 of FIGS. 1 and 4. This modulator differs from the CDMA modulator 12 of FIG. 1 in that a guard interval insertion unit 12c is provided between the CDMA spreading unit 12a and DA converter 12b.

(F) Sixth Embodiment

A method of utilizing an interference canceller to improve reception sensitivity is well known in CDMA receivers. The interference canceller demodulates a plurality of channels other than a desired signal contained in the receive signal, reconstructs an interference signal waveform from the result of demodulation other than the desired signal and subtracts this from the receive signal, thereby outputting the desired signal to thereby diminish the interference signal.

FIG. 14 is a diagram showing the structure of an interference canceller according to a sixth embodiment for removing an unwanted signal as an interference signal. This is an example in which a pilot signal that has been spread by a first spreading code is assumed to be the desired signal and pilot signals that have been spread by second to Nth spreading codes are assumed to be unwanted signals. It is assumed that an OFDM signal and CDMA signal are sent from a transmitting apparatus in time-division fashion as in the second embodiment (see FIG. 4), and that one of the N-number of pilots indicates timing.

A path searcher 71 calculates the correlation between the receive signal and spreading code for timing identification, detects the timings (delay times) $t_1$ to $t_M$ of each of the paths of multipath, and inputs the timings $t_{1\ to\ tM}$ to channel estimation units 81 of second to Nth pilot replica generators $72a_1$ to $72N_1, \ldots, 72a_M$ to $72N_M$ provided for each of the paths. The channel estimation unit 81 of each pilot replica generator has the structure shown in FIG. 15. An ith spreading code generator 81a of a jth path generates an ith spreading code CDi, a despreader 81b multiplies the digital receive signal (AD sample) by the ith spreading code CDi at the detection timing $t_j$ of the corresponding jth path to thereby perform despreading, and an averaging unit 81c averages the despread output. The averaged output signal is the channel estimation value of the ith pilot signal of the jth path.

A multiplier 82 multiplies the channel estimation unit by an ith spreading code that is output from an ith spreading code generator 83, and a delay adjusting unit 84 inputs the result to an arithmetic unit $73_j$ (j=a to N) upon delaying it by a delay time that conforms to the corresponding bus timing. The arithmetic unit $73_j$ (j=a to N) combines the unwanted signals generated by the second to Nth pilot replica generators $72a_j$ to $72N_j$ of the jth path, and an arithmetic unit 74 combines the output signals of each of the arithmetic units $73_j$ (j=a to N) and outputs the unwanted signal. An arithmetic unit 75 subtracts the unwanted signal (interference signal) from the digital receive signal, thereby outputting the channel estimation signal of the first pilot signal. Channel estimation values of the other pilot signals can be output in a similar manner.

The foregoing is a case where each path of multipath is considered. However, an arrangement in which channel estimation is performed taking only direct waves into consideration can also be adopted, as shown in FIG. 16.

EFFECTS OF THE INVENTION

Thus, in accordance with the present invention, the precision with which the timing of a frame or OFDM symbol, etc., is detected can be improved, channel estimation becomes possible and performance can be improved. Further, momentary channel estimation can be performed at receipt of one or two pilot symbols.

In accordance with the present invention, momentary channel estimation can be performed at receipt of one or two pilot symbols and sufficiently long spreading code can be used, as a result of which a number of pilots can be multiplexed.

In accordance with the present invention, a guard interval is inserted into an OFDM signal and a CDMA signal and intersymbol interference can be removed.

In accordance with the present invention, a replica signal of each pilot is generated and replica signals of pilots other than a pilot of interest are subtracted from a receive signal to thereby perform channel estimation of the pilot of interest. As a result, reception sensitivity can be improved by utilizing an interference canceller.

What is claimed is:

1. A pilot multiplexing method in an Orthogonal Frequency Division Multiplexing (OFDM) system, characterized by:
    generating an OFDM signal by OFDM-modulating transmit data;
    directly spreading pilot data by different spreading codes respectively to generate a plurality of CDMA signals;
    superimposing and transmitting the plurality of CDMA signals and the OFDM signal in the same frequency band and at the same time;
    receiving the transmitted signals;
    generating replica signals of the pilot data; and
    subtracting the replica signals of the pilot data other than pilot data of interest from a receive signal to thereby perform channel estimation of the pilot data of interest.

2. An Orthogonal Frequency Division Multiplexing (OFDM) receiving apparatus in an OFDM system for generating an OFDM signal by OFDM-modulating transmit data, directly spreading pilot data by different spreading codes respectively to generate a plurality of CDMA signals, and superimposing and transmitting the plurality of CDMA signals and the OFDM signal in a same frequency band at a same time, characterized by comprising:
    a receiver for receiving each of said CDMA signals and OFDM signal transmitted from a transmitting apparatus;
    a plurality of replica generators for generating replica signals of the pilot data; and
    a channel estimation unit for subtracting the replica signals of the pilot data other than pilot data of interest from a received CDMA signal to thereby perform channel estimation of the pilot data of interest.

* * * * *